(12) United States Patent
Källsand et al.

(10) Patent No.: US 7,204,140 B2
(45) Date of Patent: Apr. 17, 2007

(54) RADAR LEVEL GAUGE FLANGE

(75) Inventors: Johan Källsand, Linköping (SE); Magnus Ohlsson, Norsholm (SE); Magnus Håkansson, Linköping (SE)

(73) Assignee: Saab Rosemount Tank Radar AB, Gothenburg (SE)

( * ) Notice: Subject to any disclaimer, the term of this patent is extended or adjusted under 35 U.S.C. 154(b) by 112 days.

(21) Appl. No.: 10/882,648

(22) Filed: Jul. 1, 2004

(65) Prior Publication Data

US 2006/0000274 A1   Jan. 5, 2006

(51) Int. Cl.
*G01F 23/296* (2006.01)
*H01P 1/08* (2006.01)

(52) U.S. Cl. .................... 73/290 R; 333/252
(58) Field of Classification Search ............ 73/290 V; 333/252, 254; 324/637
See application file for complete search history.

(56) References Cited

U.S. PATENT DOCUMENTS

| | | | |
|---|---|---|---|
| 3,001,160 A * | 9/1961 | Trousdale | 333/252 |
| 4,665,403 A | 5/1987 | Edvardsson | 342/124 |
| 5,305,237 A | 4/1994 | Dalrymple et al. | 364/562 |
| 5,495,218 A * | 2/1996 | Erb et al. | 333/248 |
| 5,877,663 A * | 3/1999 | Palan et al. | 333/252 |
| 6,386,055 B1 * | 5/2002 | Eason | 73/866.5 |
| 6,417,748 B1 * | 7/2002 | Lopatin et al. | 333/252 |
| 6,553,830 B2 * | 4/2003 | Fahrenbach et al. | 73/290 V |
| 6,834,546 B2 * | 12/2004 | Edvardsson | 73/290 V |

FOREIGN PATENT DOCUMENTS

DE    10117642 A1    10/2002    .............. 23/284

* cited by examiner

*Primary Examiner*—Hezron Williams
*Assistant Examiner*—Ryan Christensen
(74) *Attorney, Agent, or Firm*—Westman, Champlin & Kelly, P.A.

(57) ABSTRACT

The present invention relates to a radar level measuring device for non-contact measurement of a level of a product in a container. The device comprises a flange which is mounted on the container in such a way that a lead-through of the flange at least partly covers an opening in the container. The device further comprises a waveguide part, insertable into the flange. When inserted, the insertable waveguide part is arranged to come to a stop at a distance (D) from the surface of the flange intended to face the container, along which distance (D), a waveguide is formed, forming a continuous waveguide together with the insertable waveguide part when inserted.

27 Claims, 5 Drawing Sheets

RADAR LEVEL GAUGE FLANGE

TECHNICAL FIELD

A radar level measuring device for non-contact measurement of a level of a product in a container having an opening, which device comprises a flange having a lead-through, the flange being intended for mounting on an upper mounting part of the container in such a way that the lead-through at least partly covers the opening and a contact surface of the flange rests against the upper mounting part of the container, which device further comprises a waveguide part, insertable into the flange.

A parts list is enclosed at the end of the application text.

BACKGROUND ART

Level measurement devices for measuring the level of a liquid substance in a container using radar technique are used where special conditions make the use of other level measurement devices more or less insufficient. Such conditions may be the temperature in the container, the pressure in the container and the properties of the liquid. The liquid may, for example, be some kind of petroleum product or other chemical compound that has viscous properties that adversely may affect level measurement devices which are in contact with the liquid.

Therefore radar is suitable for measuring the level of the liquid, where a signal is transmitted from an antenna, reflected on the surface of the liquid, and received by the same or another antenna. Signal processing then provides a measure of the level. An example of such a device is disclosed in U.S. Pat. No. 4,665,403.

Such an antenna for sending and/or receiving the signal generally comprises a horn antenna having an antenna feeder which feeder in turn comprises a waveguide which at least partly is filled with a dielectric, such as PTFE (Polythetrafluorethylene). The transition from the waveguide to the horn is electrically matched in order to minimize the reflected power by means of a tapered part of the dielectric filler that protrudes in the horn. The waveguide is excited by means of a feeder pin or a pair of feeder pins, where the feeder pins may either protrude from a co-axial cable, or be microstrip lines protruding from a microstrip circuit board. The feeder pins may be excited to provide one linear polarization, two orthogonal linear polarizations or circular polarization.

The parts described above form a module, in the case of a microstrip circuit board, the electronic parts necessary for signal generation are provided on that circuit board, at the module. The module is mounted at the container in question by means of a flange that seals the container, where the flange encloses at least a part of the waveguide. Only the horn, the tapered part of the filler material and a part of the waveguide are normally exposed to the conditions that are present inside the container, as the filler material is provided with a sealing element that has a sealing function between the filler material and the waveguide. The horn antenna is preferably circular, having a circular waveguide mounted to it. The waveguide may then be circular all the way, or, alternatively, starting as a rectangular waveguide that is transformed to a circular waveguide. For a circular waveguide, the sealing between the filler material and the waveguide may be in the form of one ore more O-rings. This sealing thus prevents leakage of the containments of the container to the surroundings, at the same time as it affects the microwave signal in the waveguide to a very small extent. The waveguide is normally designed in such a way that the propagation mode following the fundamental mode has a cut-off frequency that is slightly above or, in some cases, above the frequency band used for the level measurements.

The total frequency span containing all the frequency bands normally used is approximately 6–26 GHz. For different reasons, for example that different materials are encased in the container, the frequency band that is used for the level measurements may vary. Then the size of the horn, the diameter of the waveguide and the shape of the tapered part of the filler material varies accordingly. The tapered part is normally either shaped as a cone with a more or less sharp tip for lower frequencies or as a convexly protruding lens for higher frequencies. Other shapes may also occur.

Having to use different frequency bands means that different models of flanges and sealing elements have to be provided, leading to higher costs for stock-keeping of these different models. This means that the product becomes more expensive for the costumer, who has to choose one of the models available, and who will have to choose another model should the need for change of frequency band occur.

DISCLOSURE OF THE INVENTION

It is therefore an object of the present invention to provide a radar level measuring device having a flange that may be used independently of which frequency band that is used for the radar signal.

This object is achieved by means of a radar level measuring device as mentioned in the introduction, where the insertable waveguide part, when inserted, is arranged to come to a stop at a distance from the surface of the flange intended to face the container, where the flange further has a part that runs from the surface towards the intended position of the insertable waveguide part, which part extends at least said distance, forming a waveguide during said distance, thus, together with the insertable waveguide part, forming a continuous waveguide.

Preferred embodiments are disclosed in the dependent claims.

Several advantages are provided with the present invention, for example:
  Having the same flange for all the frequency bands that are applied results in the necessity of only producing and storing one type of flange, reducing the cost.
  Having the same flange for all the frequency bands that are applied also results in only one type of O-rings for sealing the inside of the flange having to be used, reducing the cost.

BRIEF DESCRIPTION OF THE DRAWINGS

The present invention will now be described more in detail with reference to the appended drawings, where FIG. 1 schematically shows a container with a partly shown radar level measuring device mounted to it.

MODES FOR CARRYING OUT THE INVENTION

Figure 1:
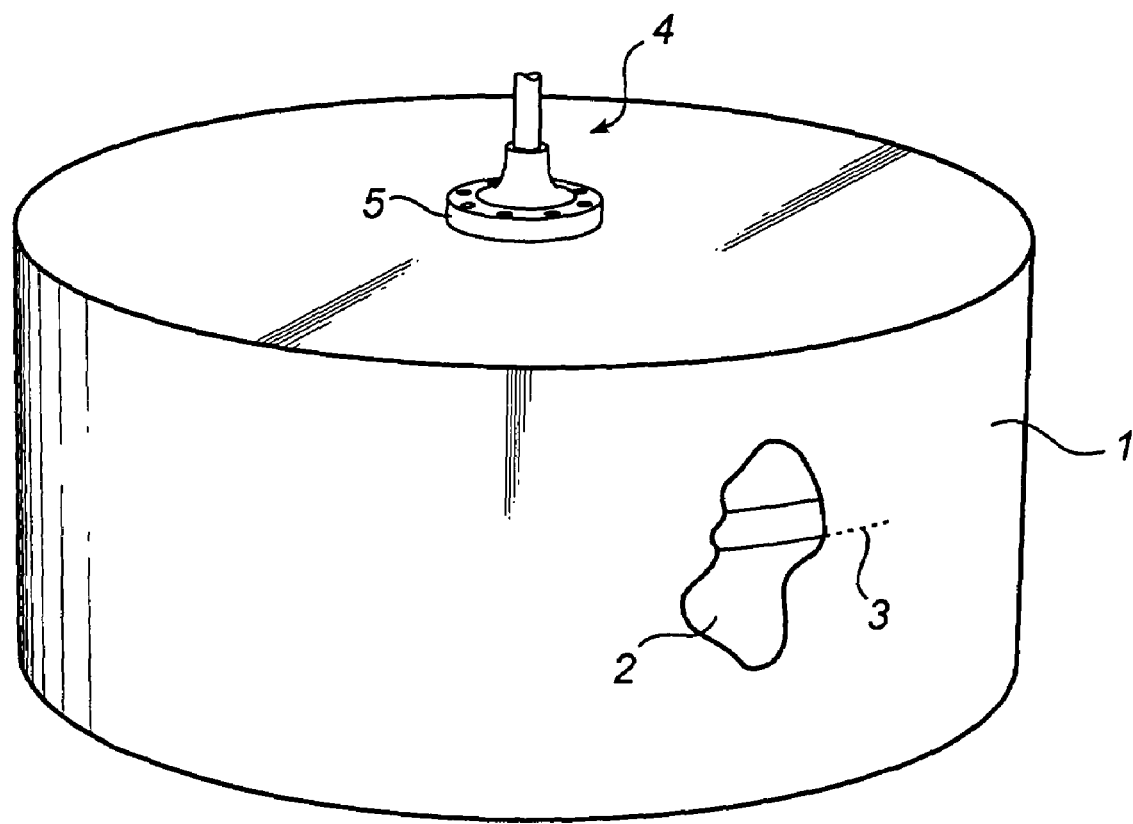
Figure 2:
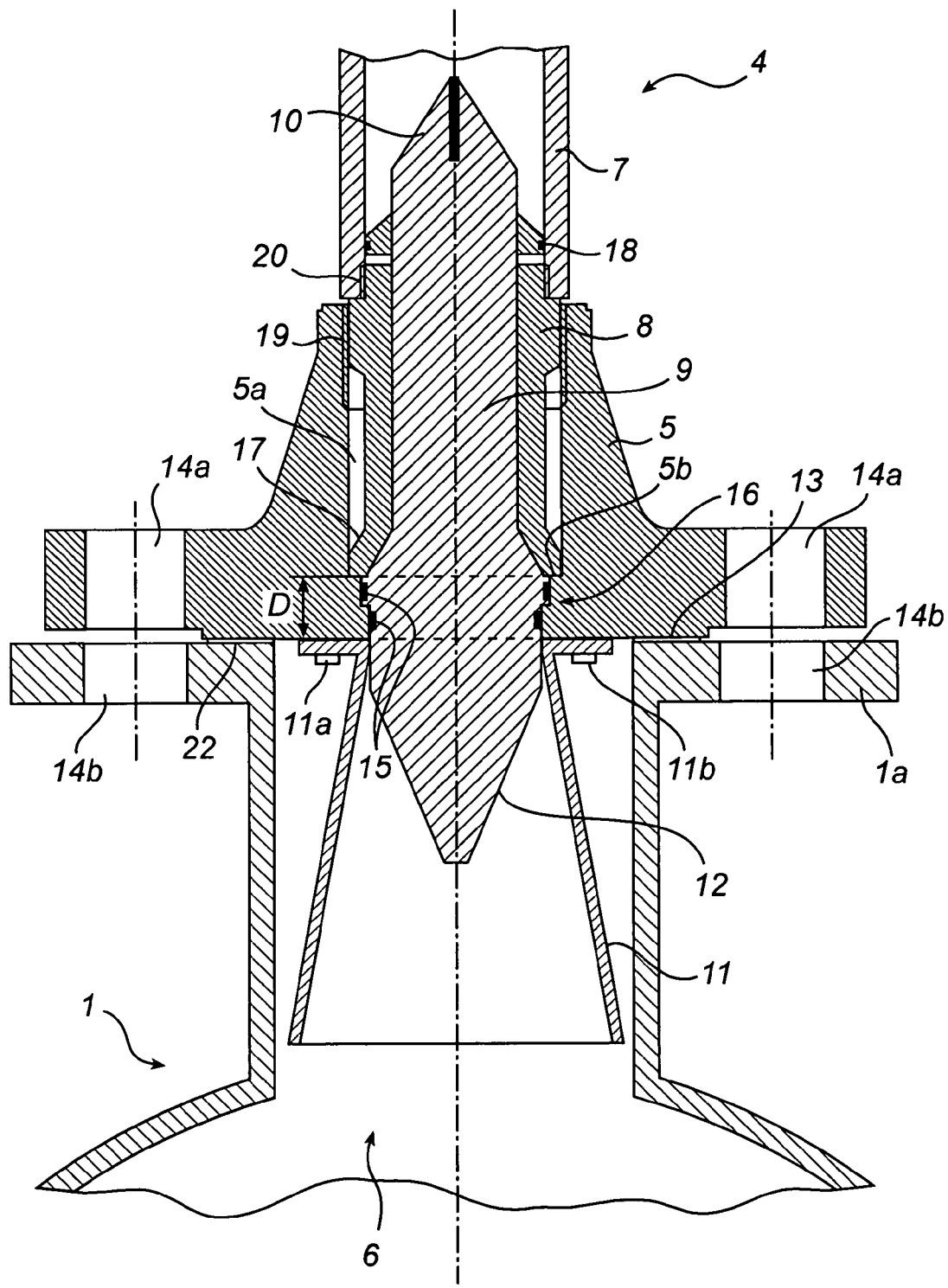
FIG. 2 shows a cross-section of a radar level measuring device according to the invention, suitable for a relatively low frequency band.
Figure 3:
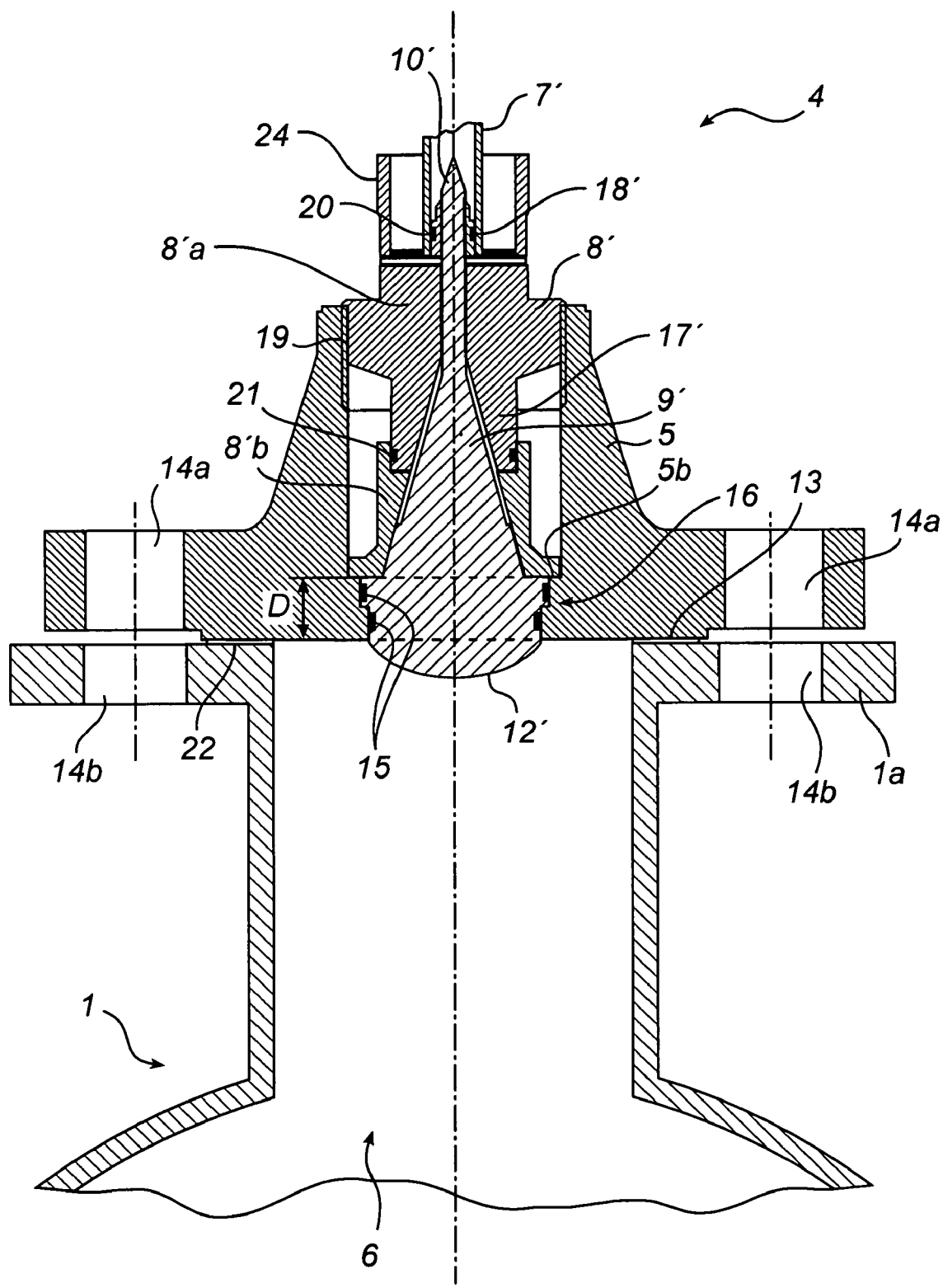
FIG. 3 shows a cross-section of a radar level measuring device according to the invention, suitable for a relatively high frequency band.

With reference to FIGS. 1, 2 and 3, a container 1 contains a product such as a liquid 2 which has a level 3 that is to be measured by means of a contactless radar measurement system 4, partly shown in FIG. 1–3. FIGS. 2 and 3 show a part of the measurement system 4 in more detail, where FIG. 2 shows the system 4 when a relatively low frequency band is used, and FIG. 3 shows the system 4 when a relatively high frequency band is used. A typical frequency band for the system 4 according to FIG. 2 has the centre frequency f=6 GHz, and a typical frequency band for the system 4 according to FIG. 3 has the centre frequency f=26 GHz.

Figure 4:
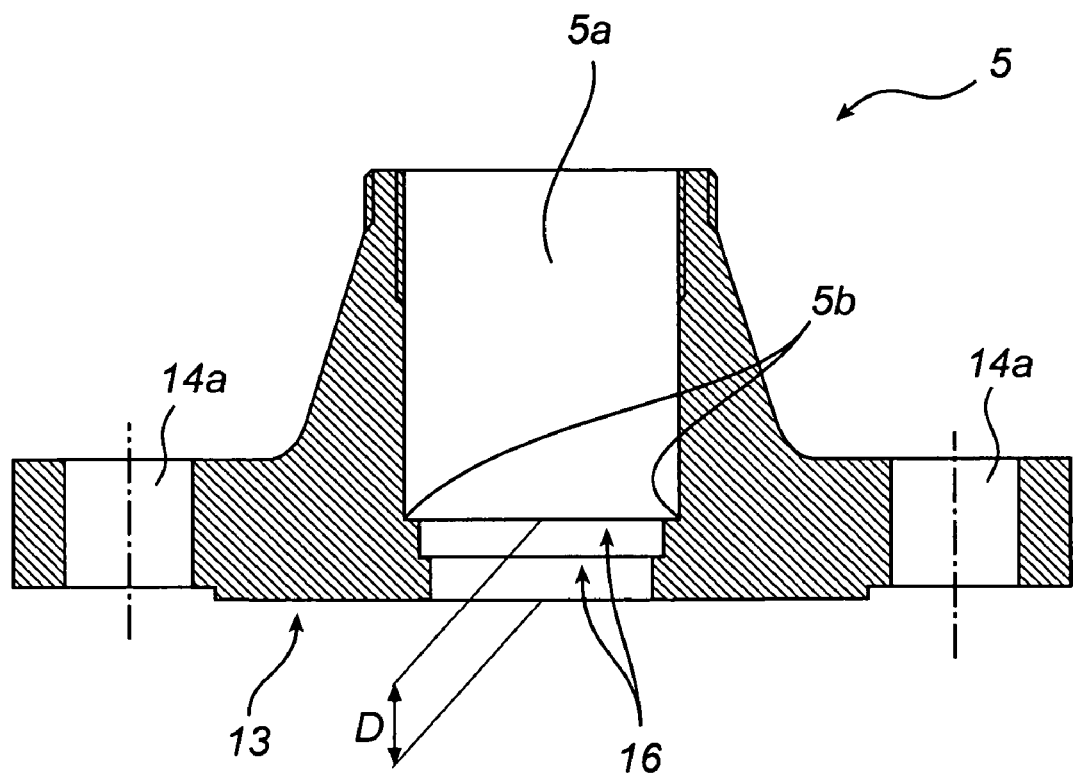
FIG. 4 shows a cross-section of a flange according to the invention.

The system 4 comprises a flange 5 mounted on the container 1 where there is an opening 6 into the container 1, allowing access to the interior of the container 1. The opening 6 in the container 1 is made as a lead-through, on which there is an upper mounting part 1a on which the flange 5 is mounted. The opening 6 in the container 1 is at least partly covered by a lead-through 5a in the flange 5, also shown in FIG. 4. FIG. 4 shows a cross-section of the flange 5, and is specially referred to when certain flange features are described.

The system 4 further comprises a first waveguide 7, 7' which is filled with air, and a second waveguide 8, 8', which second waveguide 8, 8' is filled with a dielectric filler material 9, 9', such as PTFE (Polythetrafluorethylene). The first waveguide 7, 7' leads from outside the flange 5 to the second waveguide which is located at least partly inside the flange 5, in its lead-through 5a.

There is a transition between the first 7, 7' and the second 8, 8' waveguide, where the first waveguide 7, 7' has a larger inner diameter than the second waveguide 8, 8'. The transition from the first waveguide 7, 7' to the second waveguide 8, 8' is electrically matched in order to minimize the reflected power by means of a first tapered end 10, 10' of the dielectric material 9, 9' that protrudes from the second waveguide 8, 8' into the first waveguide, where it ends. The electrical matching is performed in order to minimize the reflected power.

The system may further comprise a horn antenna 11 which is mounted on the flange 5, for example by means of bolts 11a, 11b, protruding inside the container 1 via the opening 6, which horn antenna 11 is fed via the waveguides 7, 7',8, 8', this will be discussed more in detail later. The transition from waveguide to the horn antenna 11 inside the container 1 is electrically matched in order to minimize the reflected power by means of a second tapered end 12, 12' of the dielectric material 9, 9' that protrudes into the container 1, into the horn antenna 11, where it ends.

The first waveguide 7, 7' is excited by means of a feeder pin or a pair of feeder pins, where the feeder pins may protrude from a co-axial cable or be microstrip lines protruding from a microstrip circuit board (no feeding or signal generating/processing parts shown). The feeder pins may provide one linear polarization, two orthogonal linear polarizations or circular polarization.

The flange 5 has a contact surface 13 which rests against the container 1 when the flange 5 is mounted to the container 1. Preferably, a sealing element 22 is squeezed between the contact surface 13 and the container 1. The flange 5 is further mounted on the container 1 in such a way that it covers the opening 6 in the container 1, corresponding to the lead-through 5a, and in such a way that its contact surface 13 seals the opening 6 of the container 1 with respect to said contact surface 13. The flange 5 is secured to the container 1 by means of bolts (not shown) through a number of holes 14a in the flange and corresponding holes 14b in the container 1.

Figure 5A:
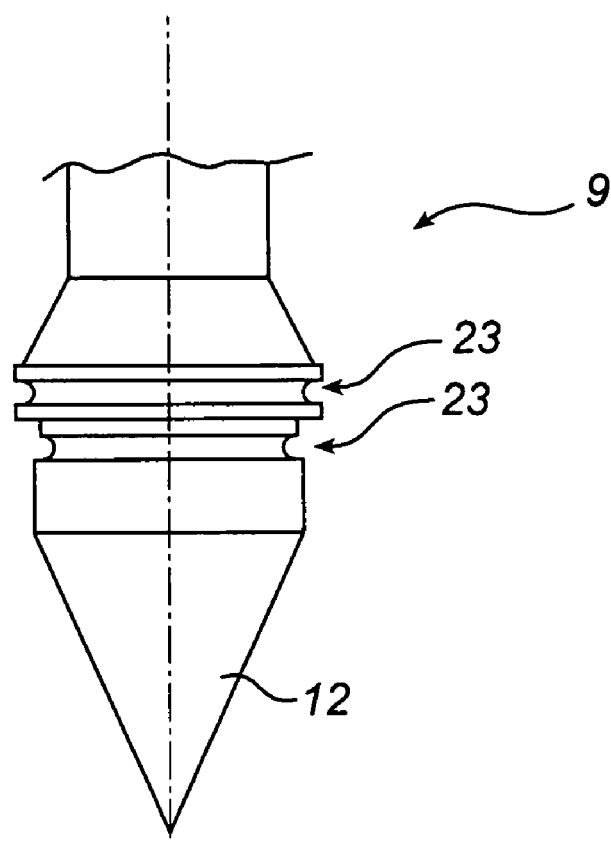
FIG. 5a schematically partly shows a dielectric material suitable for a relatively low frequency band.
Figure 5B:
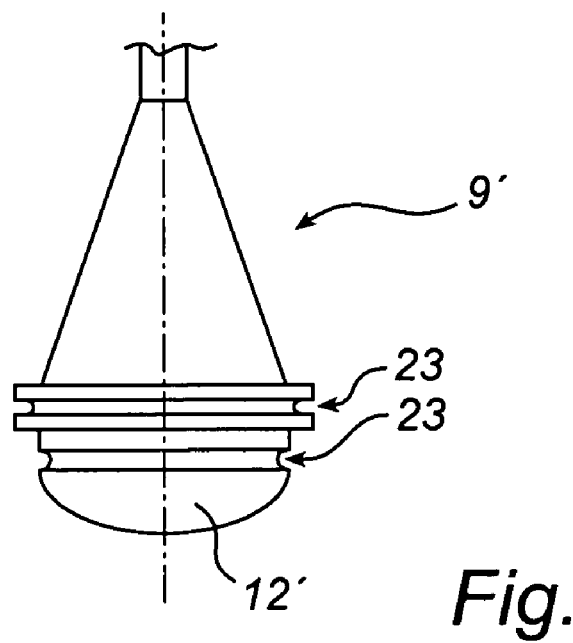
FIG. 5b schematically partly shows a dielectric material suitable for a relatively high frequency band.

The dielectric material 9, 9' fills the second waveguide 8, 8' and protrudes out of the second waveguide 8, 8' towards the container 1, but is still within the flange 5 in the part of its lead-through 5a that is closest to the container 1, before entering the container 1, during a certain distance D. The distance D is also shown in FIG. 4. During the distance D, one or more sealing elements 15, preferably in the form of O-rings 15, are placed to form a seal between the dielectric material 9, 9' and the flange 5. Preferably, with reference to FIG. 5a and FIG. 5b, recesses 23 are made in the dielectric material 9, 9', which recesses 23 are adapted to receive the sealing elements 15. Alternatively (not shown), the recesses may more or less be made in the adjacent metal instead, decreasing the recesses in the dielectric material proportionally. The recesses may be in the metal only, with no recesses in the dielectric material.

The dielectric material 9, 9' mainly follows the interior shape of the flange during the distance D. Thus the opening 6 in the container 1, is sealed from the surroundings. This is important, since there may be a high pressure and a high temperature inside the container 1. The container 1 may also contain harmful substances that should not be allowed to escape into the surroundings.

According to the invention, during the distance D, a part 16 of the lead-through 5a functions as a waveguide, as the second waveguide 8, 8' will come to a stop and rest on a shoulder 5b in the flange 5 at the distance D from the end of the flange facing the container, when the second waveguide 8, 8' is inserted into the flange 5. This flange waveguide 16 is also shown in FIG. 4, and has a shape to which the second waveguide 8, 8' adapts by means of a widening of the waveguide diameter towards the flange waveguide 16. The length of the widening part 17, 17' of the second waveguide 8, 8' depends on for which frequency band the waveguides 7, 7', 8, 8' are designed. A relatively low frequency band second waveguide 8, 8' as showed in FIG. 2 has a widening part 17 that has a lesser length than the widening part 17' of the relatively high frequency band second waveguide 8' showed in FIG. 3.

When the second waveguide diameter widens towards the flange waveguide 16, it attains an effective diameter that allows higher order modes to propagate. At the flange waveguide 16, higher modes propagate, but actually only a smaller amount of higher order modes do propagate, however. Consequently, the same flange 5 may be used for any desired frequency band among those available.

In other words, the first waveguide 7, 7', the second waveguide 8, 8' and the dielectric material 9, 9' constitutes an insertion module that is inserted into the lead-through 5a of the flange 5. The end of the second waveguide 8, 8' that comes closest to the container 1 does not protrude through all of the lead-through 5a, but comes to a stop a distance D before the lead-through 5a ends towards the container 1. Therefore, during the distance D, the lead-through 5a acts as final waveguide, the flange waveguide 16, taking over from the second waveguide 8, 8'. The diameter of the flange waveguide 16 is always the same, and the second waveguide 8, 8' will have to adapt to the transition to the flange waveguide 16 in an appropriate way according to the frequency band which the second waveguide 8, 8' is designed for.

The components that will not have to be changed when the frequency band is changed are the flange 5 and its sealing elements 15. There may be sealing elements 18, 18' between the first and second waveguide, but these will differ. Since the flange 5 and then the flange waveguide 16 is the same for all frequencies, the part of the dielectric material 9, 9' that passes through the flange waveguide 16 will have to have the same shape for all the frequencies in order for the associated O-ring 15 flange sealing elements to work, as the O-ring flange sealing elements 15 are placed at the flange waveguide part 16. The dielectric material 9 then protrudes into the container with a tapered part 12, 12' that normally is shaped as cone with a more or less sharp tip for lower frequencies and as a convexly protruding lens 12' for higher frequencies. The convexly shaped lens 12' may not need any horn, but may have sufficient antenna functionality in itself.

The widening part 17, 17' of the second waveguide 8, 8' absorbs the upwardly directed force that acts on the dielectric material 9, 9' when there is an overpressure in the container.

The second waveguide 8, 8' is preferably screw-mounted to the flange 5 by means of threads 19. The first waveguide 7, 7' is preferably screw-mounted to the second waveguide 8, 8' by means of threads 20.

The invention is not limited to the embodiments described above, but may vary freely within the scope of the appended claims. The waveguide parts may for example comprise more or less parts, which will be further discussed below, and the waveguide may be either circular or rectangular. It may also start as a rectangular, being transformed to a circular waveguide towards the container. The accompanying parts, for example the dielectric material and the antenna, are adapted to the current shape of the waveguide parts.

The antenna used may be of other known antenna designs, or, as stated above, the antenna may be omitted for higher frequency bands, where the dielectric material is shaped as a lens. Of course an antenna may be used for higher frequency bands anyway, in spite of the fact that no antenna is showed in the embodiment showed in FIG. 3. In FIG. 2, the antenna 11 is shown as not passing the lead-through opening 6, but may of course pass the lead-through opening 6 and continue into the container.

It is not necessary to utilize a dielectric material 9, 9' to fill at least a part of the insertable waveguide part 7, 7', 8, 8' as described above. Some kind of protective membrane (not shown) may be used instead, or, alternatively, no protection at all. The dielectric material 9, 9' described is, however, necessary in order to maintain the high pressure and/or temperature that may occur within the container. It is also necessary to have some kind of protection if it is desirable that vapours of the product in the container 1 do not escape the container 1.

It is further necessary to utilize some kind of electric matching of the waveguide where there are transitions, in order to minimize the reflected power. Should the dielectric material 9, 9' not be used, some other kind of matching should be necessary, since the dielectric material 9, 9' is used for electric matching.

The insertable waveguide part 7, 7', 8, 8' may be manufactured in more than the two parts shown, if necessary. The first 7, 7' and/or second waveguide 8, 8' may for example consist of two or more parts each. In FIG. 3, for example, the second wave guide part 8', which is adapted for a relatively high frequency band, is made of a first 8'a and a second 8'b part. In the intersection between the first 8'a and a second 8'b part, there is a sealing in the form of an O-ring 21 between the parts 8'a, 8'b. The second waveguide part 8' is here made in two parts 8'a, 8'b, as that facilitates the manufacturing process of the second waveguide part 8' in this case. It is, of course, possible to manufacture the second wave guide part 8' in one piece, although it may be more difficult and hence more time-consuming and expensive.

In FIG. 3, a protective cover 24, here in the form of an outer tube, covers a part of the first waveguide 7'. This is an optional protective cover that may be used due to the fact that the higher frequency band that is used, the more fragile the first waveguide 7' becomes, as the dimensions of the first waveguide 7' then gets smaller.

A further embodiment would be conceivable, where the insertable waveguide part 7, 7', 8, 8' is inserted into the flange 5 from below, i.e. from the side of the flange 5 facing the container 1. The insertable waveguide part 7, 7', 8, is secured from below by means of a screwable washer or similar (not shown), which washer, by way of example, may comprise the flange waveguide 16 and the shoulder 5b, which here constitutes a lower shoulder. Then the threads 19 securing the insertable waveguide part 7, 7', 8, 8' to the flange 5 are not necessary, instead a stopping shoulder (not shown), stopping the insertion of the insertable waveguide part 7, 7', 8, 8', is needed. The insertable waveguide part 7, 7', 8, 8 is then squeezed between the upper shoulder and the lower shoulder 5b.

Although FIG. 2 shows the system 4 when a relatively low frequency band is used, and FIG. 3 shows the system 4 when a relatively high frequency band is used, the invention may be applied for any frequency band applicable for the system.

PARTS LIST

1 Container
1a Upper mounting part
2 Product
3 Level
4 Contactless radar measurement system
5 Flange
5a Lead-through
5b Shoulder
6 Opening
7 First waveguide, relatively low frequency band
7' First waveguide, relatively high frequency band
8 Second waveguide, relatively low frequency band
8' Second waveguide, relatively high frequency band
8'a First part of second waveguide, relatively high frequency band
8'b Second part of second waveguide, relatively high frequency band
9 Dielectric material, relatively low frequency band
9' Dielectric material, relatively high frequency band
10 First tapered end of the dielectric material, relatively low frequency band
10' First tapered end of the dielectric material, relatively high frequency band
11 Horn antenna
11a, b Horn antenna bolts
12 Second tapered end of the dielectric material, relatively low frequency band
12' Second tapered end of the dielectric material, relatively high frequency band
13 Contact surface
14a Flange holes
14b Container holes
15 Sealing elements 16 Flange waveguide
17 Widening part, relatively low frequency band
17' Widening part, relatively high frequency band
18 Sealing element, relatively low frequency band
18' Sealing element, relatively high frequency band
19 Threads
20 Threads
21 Sealing element
22 Sealing element
23 Recesses
24 Protective cover

What is claimed is:

1. A radar level measuring device for non-contact measurement of a level of a product in a container having an opening, which device comprises:
a flange having a lead-through;
the flange being intended for mounting on an upper mounting part of the container in such a way that the lead-through at least partly covers the opening and a contact surface of the flange rests against the upper mounting part of container; and
and a waveguide part, insertable into the flange,
wherein the insertable waveguide part, when inserted, is arranged to come to a stop at a distance (D) from that surface of the flange which is intended to face the container,
wherein the flange further has a part that extends from the surface towards the intended position of the insertable waveguide part,
said part extending at least said distance (D), the part forming a waveguide along said distance (D), thus forming a continuous waveguide, together with the insertable waveguide part when said waveguide part is inserted,
wherein the insertable waveguide part is removably insertable in the flange;
wherein the device is further adapted for receiving different insertable waveguide parts;
wherein each of the insertable waveguide parts together with the same flange waveguide forms a continuous waveguide; and
wherein each of the insertable waveguide parts are adapted for different frequency bands by having different inner dimensions and different widening parts.

2. Measuring device according to claim 1, wherein a dielectric material is filling at least a part of the insertable waveguide part.

3. Measuring device according to claim 2, wherein the dielectric material protrudes, from the insertable waveguide part, into the container.

4. Measuring device according claim 1, wherein the flange waveguide part has a cross-section area that differs from the cross-section area of the insertable waveguide part.

5. Measuring device according to claim 4, wherein the part of the insertable waveguide part that is closest to the flange waveguide part, is electrically matched to a transition from the insertable waveguide part to the flange waveguide part in order to minimize the reflected power in the continuous waveguide.

6. Measuring device according to claim 1, wherein the insertable waveguide part, when inserted into the flange, comes to a stop due to a shoulder in the flange.

7. Measuring device according to claim 6, wherein the part of the insertable waveguide part that is closest to the flange waveguide part, is electrically matched to a transition from the insertable waveguide part to the flange waveguide part in order to minimize the reflected power in the continuous waveguide.

8. Measuring device according to claim 1, wherein at the transition from the insertable waveguide part to the flange waveguide part, the part of the insertable waveguide part that is closest to the flange waveguide part comprises a widening part that widens the interior waveguide cross-section towards the flange waveguide part.

9. Measuring device according to claim 8, wherein the widening part absorbs the upwardly directed force that acts on the dielectric material filling at least a part of the insertable waveguide part, when there is an overpressure in the container.

10. Measuring device according to claim 1, wherein sealing means are inserted between the flange waveguide part and the dielectric material.

11. Measuring device according to claim 10, wherein the dielectric material is equipped with recesses which are adapted to receive the sealing means.

12. Measuring device according to claim 10, wherein the sealing means are in the form of O-rings.

13. Measuring device according to claim 12, wherein the dielectric material is equipped with recesses which are adapted to receive the sealing means.

14. Measuring device according to claim 10, wherein the flange waveguide part is equipped with recesses which are adapted to receive the sealing means.

15. Measuring device according to claim 12, wherein the flange waveguide part is equipped with recesses which are adapted to receive the sealing means.

16. Measuring device according to claim 1, wherein at least one of the waveguide parts has a circular cross-section.

17. Measuring device according claim 1, wherein a sealing element is squeezed between the contact surface of the flange and the container.

18. Measuring device according to claim 1, wherein the insertable waveguide part comprises a first and a second waveguide part where the first waveguide part is closer to the flange waveguide part than the second waveguide part.

19. Measuring device according to claim 18, wherein a transition from the first waveguide to the second waveguide is electrically matched in order to minimize the reflected power by means of a first tapered end of the dielectric material that protrudes from the second waveguide into the first waveguide, where it ends.

20. Measuring device according to claim 18, wherein the second waveguide comprises a first part and a second part.

21. Measuring device according to claim 19, wherein the second waveguide comprises a first part and a second part.

22. A radar level measuring device for non-contact measurement of a level of a product in a container having an opening, which device comprises:
a flange having a lead-through;
the flange being intended for mounting on an upper mounting part of the container in such a way that the lead-through at least partly covers the opening and a contact surface of the flange rests against the upper mounting part of container; and
a waveguide part, insertable into the flange,
wherein the insertable waveguide part, when inserted, is arranged to come to a spot at a distance (D) from that surface of the flange which is intended to face the container,
wherein the flange further has a part that extends from the surface towards the intended position of the insertable waveguide part, said part extending at least said distance (D), the part forming a waveguide along said distance (D), thus forming a continuous waveguide, together with the insertable waveguide part when said waveguide part is inserted, wherein at the transition from the insertable waveguide part to the flange waveguide part, the part of the insertable waveguide part that is closest to the flange waveguide part comprises a widening part that widens the interior waveguide cross-section towards the flange waveguide part;

wherein the insertable waveguide part, when inserted into the flange, comes to a stop due to a shoulder in the flange;

wherein the shoulder in the flange is formed as an inward protrusion in a lead-through functioning as a waveguide in the flange; and wherein the widening part of the insertable waveguide part is adapted to come to a stop to the shoulder when inserted into the flange.

23. The measuring device according to claim 22, wherein a dielectric material is filling at least a part of the insertable waveguide part.

24. The measuring device according to claim 23, wherein the widening part absorbs the upwardly directed force that acts on the dielectric material, when there is an overpressure in the container.

25. The measuring device according to claim 22, wherein the part of the insertable waveguide part that is closest to the flange waveguide part, is electrically matched to a transition form the insertable waveguide part to the flange waveguide part in order to minimize the reflected power in the continuous waveguide.

26. The measuring device according to claim 22, wherein the insertable waveguide part comprises a first and a second waveguide part where the first waveguide part is closer to the flange waveguide part than the second waveguide part.

27. The measuring device according to claim 22, wherein a transition from first waveguide to second waveguide is electrically matched in order to minimize the reflected power by means of a first tapered end of the dielectric material that protrudes form the second waveguide into the first waveguide, where it ends.

* * * * *

UNITED STATES PATENT AND TRADEMARK OFFICE
CERTIFICATE OF CORRECTION

| | |
|---|---|
| PATENT NO. | : 7,204,140 B2 |
| APPLICATION NO. | : 10/882648 |
| DATED | : April 17, 2007 |
| INVENTOR(S) | : Kallsand et al. |

Page 1 of 1

It is certified that error appears in the above-identified patent and that said Letters Patent is hereby corrected as shown below:

<u>Column 8,</u>
Line 62, delete "spot" and insert --stop--.

<u>Column 10,</u>
Line 16, after "from", insert --a--.

<u>Column 10,</u>
Line 16, after "to", insert --a--.

Signed and Sealed this

Eighteenth Day of September, 2007

JON W. DUDAS
*Director of the United States Patent and Trademark Office*